United States Patent Office 3,557,078
Patented Jan. 19, 1971

3,557,078
METHOD FOR TREATING AND IMPROVING THE PROPERTIES OF PROTEINACEOUS MATTER COMPRISING REACTING HIDE MATERIAL WITH HCHO AND A MALONIC ACID
Stephen H. Feairheller, Maryann M. Taylor, and Edward M. Filachione, Philadelphia, Pa., assignors to the United States of America as represented by the Secretary of Agriculture
No Drawing. Continuation of application Ser. No. 635,973, May 1, 1967. This application Oct. 27, 1969, Ser. No. 869,952
Int. Cl. C08h *1/06, 7/06*
U.S. Cl. 260—123.7             10 Claims

ABSTRACT OF THE DISCLOSURE

Proteinaceous matter such as collagen of animal origin is treated with formaldehyde and malonic or a substituted malonic acid to produce a chemically modified substance having improved ability to bind and utilize mineral tanning agents. When the proteinaceous matter is collagen from animal hides and skins, retanning of the modified collagen with conventional mineral tanning agents produces a high quality leather product with improved hydrothermal stability and resistance to deterioration.

---

This application is a continuation of application Ser. No. 635,973 filed May 1, 1967, now abandoned.

A non-exclusive, irrevocable, royalty-free license in the invention herein described, throughout the world for all purposes of the United States Government, with the power to grant sublicenses for the purposes, is hereby granted to the Government of the United States of America.

This invention relates to the treatment of proteinaceous matter, especially protein matter such as collagen from animal hides, skins, tendons, connective tissue and the like, and more particularly it relates to the chemical treatment of such protein matter with formaldehyde and malonic or a substituted malonic acid.

Collagen, a proteinaceous substance present in animal tissues has long been employed as raw material for the preparation of leathers and other articles such as sponges, films, fibers and filaments and is converted into these useful forms by combining with a tanning agent. The more commonly used tanning agents include formaldehyde, glyoxal, chrome, zirconium, alum, and vegetable tannins. These tanning agents not only participate in the tanning reaction, but they also become an integral part of the final tanned product by combining with various active groups of the peptide chain such as carboxyl, amino and hydroxyl groups.

An object of this invention is to provide a novel method for treating proteinaceous matter such as collagen as found in animal tissues.

Another object is to chemically modify the collagen of animal tissues so that when it is further tanned it will produce an improved, high quality leather product.

A further object is to produce a high quality leather having a high shrink temperature.

Other objects and a fuller understanding of the invention may be had by referring to the following description and claims.

According to the present invention proteinacous material, preferably in the form of collagen as found in animal hides and skins, is treated with formaldehyde and a malonic acid of the general formula $RCH(CO_2H)_2$ wherein R is selected from the group consisting of hydrogen and alkyl, cycloalkyl, aryl and aralkyl radicals, thereby producing a chemically modified product in which the bonds attaching the new reactive groups to the proteinaceous matter are stable even to conditions which completely degrade the protein to its constituent amino acids. In addition, this chemically modified product is superior to untreated proteinaceous matter or untreated collagen in its ability to bind and utilize conventional mineral tanning agents, and when further tanned by conventional mineral tanning agents the hydrothermal stability and resistance to deterioration of the product are improved over these properties of products not made by the process of this invention.

This invention can be practiced with any type of protein, but we prefer collagen or the protein matter from animal hides, skins, tendons, connective tissue and the like. The collagen may be in any convenient form such as the pelt as removed from slaughtered animals. This may be, for example, cowhide, horsehide, calfskin, sheepskin, pigskin, goatskin, shearlings, fur skins or any other animal hide or skin. The hides and skins may be treated by our process with the hair on the pelt, that is, immediately after being removed from the animal as is done when shearlings and fur skins are tanned. They may also be treated after some of the conventional pretanning processes as, for example, after liming and baiting to remove hair and non-collagenous protein and after pickling.

We have found that proteinaceous matter such as collagen found in animal hides and skins can be treated with formaldehyde and malonic or a substituted malonic acid in an aqueous medium under very mild conditions to produce a chemically modified substance that is better able than untreated proteinaceous matter to bind mineral tanning agents and to utilize the bound mineral tanning agents. In addition to having a higher initial hydrothermal stability, the mineral tanned product resisted deterioration better than tanned products that were not pretreated by the process of our invention. The results obtained from chrome tanning pickled cabretta skins can be seen in Table I.

The shrink temperature ($T_s$) of leather is intimately related to the type and degree of tannage used in its preparation. Untanned hides have a very low shrink temperature (about 60° C.). Conventionally tanned leathers have a somewhat elevated shrink temperature depending on the type and amount of tanning agent. When a pickled cabretta skin with no other pretreatment (number 1, Table I) was chrome tanned, the product had a shrink temperature of 98° C. A pickled cabretta skin that was pretreated with formaldehyde (number 2, Table I) prior to being chrome tanned produced a product having a shrink temperature of 97° C. However, when a pickled cabretta skin was pretreated by the process of our invention (number 3, Table I) and then chrome tanned, the shrink temperature of the product increased significantly to 106° C. In addition, the pretreatment by the process of this invention has a very desirable effect on the storage properties of the finished product. This fact is verified in Table I by the shrink temperature figures after six and ten months aging. For example, after aging for 10 months, the product made by the process of this invention still had a shrink temperature of 102° C., while that of the sample not pretreated and that of the sample pretreated with folmaldehyde had dropped to 80° and 85° C., respectively. After laundering in hot (50° C.) soapy water, the shrink temperature of skins pretreated by the process of this invention was still significantly higher than that of skins not pretreated and that of skins pretreated with formaldehyde only. As shown in Table II, the skins pretreated with formaldehyde and malonic acid had significantly higher shrink temperatures even after eight washes.

As previously stated, the skins used to obtain the results shown in Table I and II were chrome tanned after the indicated initial pretreatment. However, the scope of this invention is not limited to chrome tanning, but includes any of the conventional mineral tanning agents and methods. Results similar to those shown in Tables I and II were obtained when aluminum and zirconium tannages were used in place of the chrome tannage (Tables III and IV).

Treatment of the proteinaceous matter which, in the illustrations already discussed and in the examples to follow, is in the form of collagen as found in cabretta skins, involves treating the pickled skin with a buffered aqueous solution of formaldehyde and malonic or substituted malonic acid under conditions normally used for tanning. Although the amount of malonic or substituted malonic acid used can be varied from about 1 to 10%, about 5 to 6% based on the drained pickled weight (d.p.w.) of the skin gives optimum results. At least 2% by volume of formaldehyde based on the d.p.w. of the skin is required. The skins are completely covered with an aqueous solution containing at least 5% salt which reduces swelling of the skins. Although the optimum pH is 4.0 and is achieved by using sodium formate as a buffering agent, the treatment has been successfully done in solutions ranging in pH from about 3.0 to about 8.0. Complete treatment takes about three days, but about 75% of the total effect is achieved within one day. After completion of the treatment, the skins are washed free of all reagents and then reacidified and tanned with an appropriate tanning agent by conventional methods.

In place of malonic acid, monosubstituted malonic acids in which the substituent is alkyl, cycloalkyl, aryl or aralkyl can be successfully used in this process. Examples of such substituted acids are ethyl malonic acid, butyl malonic acid, phenyl malonic acid, benzyl malonic acid and cyclohexyl malonic acid.

The following examples are given to illustrate the process, but it is to be understood that the invention is not limited to the specific materials or conditions shown.

EXAMPLE I

A pickled cabretta skin weighing 415 g. was placed in a churn and 830 ml. of water, 42 g. of sodium chloride, and 42 g. of sodium formate were added. When the churn had been run for 30 minutes, 27 ml. of formaldehyde and 20 g. of malonic acid were added and the churn was run for 16 hours. The pH of the solution was 3.5. The solution was removed and the product was washed with running water for one hour. This skin is referred to as number 3 in Tables I and II.

EXAMPLE II

A second pickled cabretta skin weighing 310 g. was given the same treatment as the skin in Example I using a proportionate amount of reagents with the exception of malonic acid which was omitted. This skin is referred to as number 2 in Tables I and II.

EXAMPLE III

The pretreated skins from Examples I and II, together with a pickled cabretta skin weighing 406 g. (referred to as number 1 in Table I and II) were placed in 1130 ml. of water containing 45 g. of salt. Dilute sulfuric acid was added until the pH of the solution was 2.3. This pH was maintained during at least 30 minutes of churning. A one-third basic chromic sulfate tanning agent (Tanolin R) in the amount of 102 g. was added in the form of an 18% solution in three portions at 20 minute intervals. The churning was then continued overnight. The pH of the solution was adjusted to ca. 4.0 with a 4% sodium bicarbonate solution. After the pH had stabilized, the tumbling was continued for 2 hours. The solution was removed and skins were washed with running water for one hour. The shrink temperature was measured and skins were processed into finished garment leather with a regular back in a tannery. The shrink temperatures of the chrome tanned, the finished and the aged finished skins are shown in Table I. The shrink temperatures of the washed finished leather are shown in Table II.

EXAMPLE IV

Two pickled cabretta skins were treated by the process of Example I and two pickled skins by the process of Example II. The total weight of the four pickled skins was 1,306 g. The four treated skins were combined and retanned with alum as follows: They were immersed in 1,306 ml. of water and then 131 g. of salt was added followed by 653 ml. of an 18% (by weight) solution of aluminum acetate. The pH was 2.0. After churning for 16 hours the pH was 4.2. A saturated sodium bicarbonate solution was added until the pH had stabilized at about 4.7. The solution was removed and the skins were washed with running water for one hour. They were processed into finished white garment leather by combining with a regular back at a tannery. The finished leathers were submitted to laundering tests. The shrink temperatures before and after washing are shown in Table III.

EXAMPLE V

One pickled cabretta skin was treated by the process of Example I and another by the process of Example II. The total weight of the two pickled skins was 731 g. The two treated skins were combined and retanned with zirconium tanning agent as follows: The skins were immersed in 1,200 ml. of water and then 60 g. of salt was added followed by 185 g. of zircotan T. The pH was 1.9. The skins were churned for 3 hours after which 22 g. of sodium acetate was added. Churning was continued for 30 minutes and 44 g. of sodium bicarbonate was added. The skins were churned for one additional hour. The pH was 5.0. The solution was removed and the skins were washed with running water for one hour. They were finished into a white garment leather by a tanner using conventional post-tanning processes. The finished leathers were submitted to laundering tests. The shrink temperatures before and after washing are shown in Table IV.

EXAMPLES VI–XI

A pickled cabretta skin was cut into 18 pieces of about equal size. These were then divided into 6 groups of 3 pieces so that each group had a representative piece from each of 3 different areas of the skin. Each group of 3 pieces was then pretreated with the reagents shown in Table V and then chrome retanned. The shrink temperatures of the chrome retanned products are shown in the last column of Table V.

TABLE I

[Effect of Pretreatment on the Hydrothermal Stability of Chrome-Tanned, Finished, and Aged Lether]

| | | $T_s$ (° C.) after— | | | |
|---|---|---|---|---|---|
| Skin No. | Pretreatment | Chrome tanning | Finishing | Aging six months | Aging ten months |
| 1 | Control | 98 | 89 | 83 | 80 |
| 2 | Formaldehyde | 97 | 90 | 85 | 85 |
| 3 | Formaldehyde and malonic acid | 106 | 105 | 104 | 102 |

NOTE.—$T_s$ is shrinkage temperature as determined on test specimens which were freely suspended in water. Those above 100° were determined in a pressure apparatus. (J.A.L.C.A. 60 15, 1965).

TABLE II

[Effect of Pretreatment on the Resistance to Deterioration of Chrome-Tanned, Finished Leather]

| | | $T_s$ (° C.) after— | | | |
|---|---|---|---|---|---|
| Skin No. | Pretreatment | 0 washes | 2 washes | 4 washes | 8 washes |
| 1 | Control | 89 | 80 | 80 | 76 |
| 2 | Formaldehyde | 90 | 78 | 77 | 74 |
| 3 | Formaldehyde and malonic acid | 105 | 96 | 92 | 91 |

TABLE III

[Effect of Pretreatment on the Hydrothermal Stability and the Resistance to Deterioration of Aluminum Tanned, Finished Leather]

| | $T_s$ (° C.) after— | | | | |
|---|---|---|---|---|---|
| Pretreatment | Aluminum tanning | Finishing | 2 washes | 4 washes | 5 washes |
| Formaldehyde | 85 | 79 | 74 | 74 | a 72 |
| Formaldehyde and malonic acid | 88 | 86 | 80 | 78 | 78 | a These skins were discolored (brown) and quite stiff while the others were still white and soft.

TABLE IV

[Effect of Pretreatment on the Hydrothermal Stability and the Resistance to Deterioration of Zirconium Tanned, Finished Leather]

| | $T_s$ (° C.) after— | | | | |
|---|---|---|---|---|---|
| Pretreatment | Zirconium Tanning | Finishing | 2 washes | 4 washes | 5 washes |
| Formaldehyde | 92 | 80 | 71 | 67 | 65 |
| Formaldehyde and malonic acid | 94 | 87 | 77 | 72 | 72 |

TABLE V

Effect of Pretreatment with Malonic and Substituted Malonic Acids on the Hydrothermal Stability of Chrome Tanned Leather]

| Pretreatment | | Weight of three pieces, g. | Volume of formaldehyde, ml. | Weight of malonic or substituted malonic acid, g. | Average $T_s$ after chrome retanning, ° C. |
|---|---|---|---|---|---|
| Example No.: | | | | | |
| VI | Formaldehyde | 46.9 | 5.1 | | 100 |
| VII | Formaldehyde and malonic acid | 51.0 | 5.5 | 4.1 | 111 |
| VIII | Formaldehyde and ethylmalonic acid | 56.2 | 6.1 | 5.7 | 105 |
| IX | Formaldehyde and butylmalonic acid | 59.4 | 6.4 | 7.3 | 104 |
| X | Formaldehyde and phenylmalonic acid | 55.8 | 6.0 | 7.7 | 106 |
| XI | Formaldehyde and benzylmalonic acid | 55.1 | 6.0 | 8.2 | 109 |

We claim:

1. A process comprising reacting hide material with at least a 2% by volume of formaldehyde, based on the drained pickled weight (d.p.w.) of the hide, and about from 1% to 10%, based on the drained pickled weight of the hide, of a malonic acid of the general formula $RCH(CO_2H)_2$ wherein R is selected from the group consisting of hydrogen and alkyl, cycloalkyl, aryl, and aralkyl radicals, in aqueous medium at a pH of about 4.0 to obtain a chemically modified hide material of improved ability to bind and utilize mineral tanning agents.

2. The process of claim 1 wherein R is hydrogen.

3. The process of claim 1 wherein R is alkyl.

4. The process of claim 1 where R is aryl.

5. The product produced by the process of claim 1.

6. A process comprising treating the product of claim 5 with a mineral tanning agent selected from the group consisting of chrome, alum, and zirconium, to produce a high quality leather product with improved hydrothermal stability and resistance to deterioration.

7. The process of claim 6 wherein the mineral tanning agent is chrome.

8. The process of claim 6 wherein the mineral tanning agent is alum.

9. The process of claim 6 wherein the mineral tanning agent is zirconium.

10. The product produced by the process of claim 6.

References Cited

UNITED STATES PATENTS

| 2,819,754 | 1/1958 | Feigley | 154—25 |
| 2,851,329 | 9/1958 | Seligsberger | 8—94.26 |
| 2,886,399 | 5/1959 | Pasternak et al. | 8—94.1 |

WILLIAM H. SHORT, Primary Examiner

H. SCHAIN, Assistant Examiner

U.S. Cl. X.R.

8—94.21, 94.26, 94.33